(12) United States Patent
Oh

(10) Patent No.: US 7,916,450 B2
(45) Date of Patent: Mar. 29, 2011

(54) CERAMIC SLURRY COMPOSITION, METHOD FOR PRODUCING THIN GREEN SHEET BY EXTRUSION, AND ELECTRONIC DEVICE FABRICATED USING THE GREEN SHEET

(75) Inventor: Sung Il Oh, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 393 days.

(21) Appl. No.: 12/116,683

(22) Filed: May 7, 2008

(65) Prior Publication Data

US 2008/0213576 A1   Sep. 4, 2008

Related U.S. Application Data

(62) Division of application No. 10/664,907, filed on Sep. 22, 2003, now abandoned.

(30) Foreign Application Priority Data

Jun. 19, 2003   (KR) .................................. 2003-39938

(51) Int. Cl.
*H01G 4/14*   (2006.01)
*B32B 27/20*   (2006.01)

(52) U.S. Cl. .................. 361/321.4; 361/321.2; 524/402; 524/502; 524/515; 428/339

(58) Field of Classification Search ............... 361/321.2, 361/321.4; 428/339; 524/401, 502, 515
See application file for complete search history.

(56) References Cited

U.S. PATENT DOCUMENTS

| 4,379,109 A | 4/1983 | Simpson |
| 5,268,415 A | 12/1993 | Pieterse et al. |

FOREIGN PATENT DOCUMENTS

| JP | 60180954 A | * | 9/1985 |
| JP | 63147853 A | * | 6/1988 |
| JP | 04-112417 | | 4/1992 |
| JP | 2001-106580 | | 4/2001 |
| JP | 2001-143962 | | 5/2001 |
| JP | 2001-247375 | | 9/2001 |
| KR | 100193381 B1 | | 2/1999 |
| WO | 91/01346 A1 | | 2/1991 |

OTHER PUBLICATIONS

Derwent abstract 1988-210179 for JP 63-147853, Jun. 20, 1988.*
Derwent abstract 1985-267384 for JP 60-180954 A, Sep. 14, 1985.*

* cited by examiner

*Primary Examiner* — Vickey Nerangis
(74) *Attorney, Agent, or Firm* — Lowe Hauptman Ham & Berner LLP

(57) ABSTRACT

A ceramic slurry composition includes 20~50 wt. % of a ceramic powder, 2~10 wt. % of a polymer having average molecular weight of 400,000 or more, 0.1~2 wt. % of a polymer having hydrogen bond-forming functional groups, and 40~75 wt. % of a solvent. If necessary, the ceramic slurry composition further includes 1~5 wt. % of a polymer having weight average molecular weight of 400,000 or less.

7 Claims, 3 Drawing Sheets

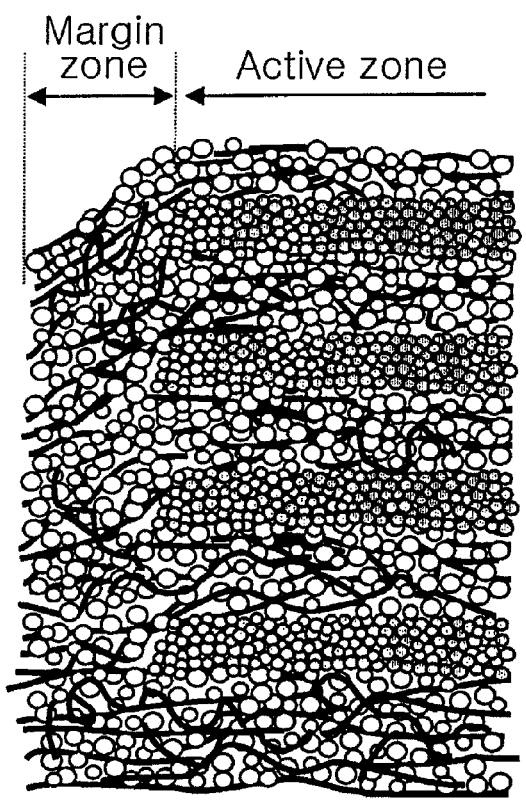 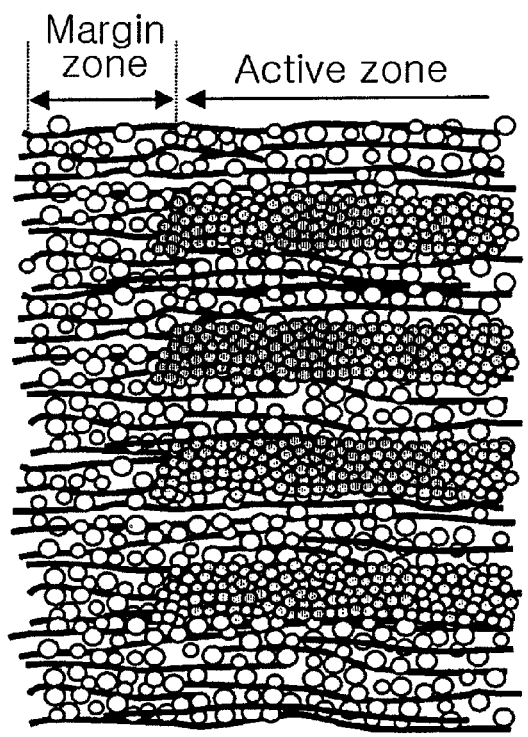
Prior art
FIG. 3a
FIG. 3b

CERAMIC SLURRY COMPOSITION, METHOD FOR PRODUCING THIN GREEN SHEET BY EXTRUSION, AND ELECTRONIC DEVICE FABRICATED USING THE GREEN SHEET

RELATED APPLICATIONS

The present application is a division of U.S. application Ser. No. 10/664,907, filed Sep. 22, 2003, which is based on, and claims priority from Korea Application Number 2003-39938, filed Jun. 19, 2003, the disclosures of which are hereby incorporated by reference herein in their entirety.

BACKGROUND OF THE INVENTION

1. Field of the Invention

The present invention relates to a ceramic slurry composition for producing a thin green sheet using an extrusion-stretching process, and an electronic device fabricated using the green sheet. More particularly, the present invention relates to a ceramic slurry composition for producing a thin green sheet which has a thickness of 10 µm or less and can be laminated to form a 40-layer or more stack, a method for producing the green sheet by extrusion, and an electronic device fabricated using the green sheet.

2. Description of the Related Art

Generally, chip components such as MLCCs (Mutilayer Ceramic Capacitors), chip inductors and the like are fabricated by alternately laminating ceramic green sheets and internal electrodes, and pressing the laminated structure and sintering it.

Ceramic green sheets are commonly produced by a tape casting process. According to the tape casting process, the green sheets are produced by coating a ceramic slurry solution with a uniformly dispersed ceramic powder therein onto a support film using a die coater, doctor blade, etc., and drying the coated slurry.

To produce a few tens of micrometers or less thick thin green sheet using the tape casting process, the ceramic slurry solution should have a low viscosity. When the viscosity of the slurry solution is, however, too low, the shape maintenance of a film coated onto the support film becomes difficult, causing an inhomogeneous thickness of a final sheet. In addition, due to a poor strength of the green sheet, damages to the green sheet, such as splitting, are likely to occur when the green sheet is removed from a substrate. Furthermore, lamination of the thin green sheet is difficult.

In order to prevent the damages to the green sheet, polymers used as binders must have a high molecular weight. However, when the molecular weight of the polymers is too high, it is difficult to produce a green sheet in the form of a thin film. In addition, since the solubility of the polymers in solvents is low, the polymer particles are precipitated in an inhomogeneously gelled state, which leads to defects in chip components fabricated using the high molecular weight polymers as binders.

PCT publication WO 91/01346 suggests a green sheet which can be produced using an extrusion-stretching process. According to the prior art, a green sheet having a thickness of 25 µm or less is produced by extrusion-stretching slurry including a ceramic powder, a polymer having a molecular weight of 400,000 or more, and a solvent for gelling the polymer. Since the extrusion-stretching process does not require any substrate to produce the green sheet, the green sheet has a uniform thickness, compared to green sheets produced using a tape casting process.

In the prior art, since the green sheet is produced using the ultra-high molecular weight polymer, there is a problem of a poor interlayer adhesive strength when laminated and pressed, due to a high modulus of elasticity and a non-polarity of the polymer. Accordingly, when the green sheet is laminated and sintered, cracks and delamination occur between the laminated green sheets and thus it is difficult to fabricate chip components using the green sheets.

As recent technical development in the field of compact and high performance electronic devices has progressed, there exists a need for small chip components (electronic devices). To meet this need, thin green sheets are required to have a thickness of 10 µm or less and be laminated to form a 40-layer or more stack. However, since the green sheet of the prior art has a problem that the cracks between layers occur due to its poor interlayer adhesive strength, it cannot be utilized in the fabrication of 40 layers or higher chip components. The lamination of green sheets into 40 layers or higher for fabricating high performance electronic devices causes a problem of 'pillowing'. This pillowing refers to a phenomenon that when green sheets and internal electrodes are laminated to each other and pressed, a margin zone where no internal electrodes are provided or sufficient internal electrodes are not provided is lower in height than an active zone where sufficient internal electrodes are provided, and thus the margin zone is collapsed and the active zone is swelled (FIG. 3a). This pillowing phenomenon results in deformation of chip appearance.

SUMMARY OF THE INVENTION

Therefore, the present invention has been made in view of the above problems of the prior art, and it is an object of the present invention to provide a ceramic slurry composition for producing a thin green sheet which can be laminated to form a several tens of layer thick stack by increasing interlayer adhesive strength.

It is another object of the present invention to provide a ceramic slurry composition for producing a green sheet which can solve a pillowing phenomenon that a zone where internal electrodes are formed is swelled, and prevent occurrence of cracks and delamination during sintering.

It is another object of the present invention to provide a method for producing the green sheet using an extrusion-stretching process.

It is yet another object of the present invention to provide an electronic device fabricated using the green sheet. In order to accomplish the above objects of the present invention, there is provided a ceramic slurry composition comprising 20~50 wt. % of a ceramic powder, 2~10 wt. % of a polymer having an average molecular weight of 400,000 or more, 0.1~2 wt. % of a polymer having hydrogen bond-forming functional groups, and 40~75 wt. % of a solvent.

In accordance with one aspect of the present invention, there is provided a ceramic slurry composition comprising 20~50 wt. % of a ceramic powder, 2~10 wt. % of a polymer having an average molecular weight of 400,000 or more, 0.1~2 wt. % of a polymer having hydrogen bond-forming functional groups, 40~75 wt. % of a solvent, and 1~5 wt. % of a polymer having an average molecular weight of 400,000 or less.

In the present invention, the polymer having an average molecular weight of 400,000 or more is referred to as a 'high molecular weight polymer', while the polymer having an average molecular weight of 400,000 or less is referred to as a 'low molecular weight polymer.' One representative example of these polymers is polyolefins.

The hydrogen bond-forming functional groups are selected from the group consisting of —OH, —COOH, —COOCH$_3$, —NH$_2$ and —NHCO. Examples of the polymer having the hydrogen bond-forming functional groups include polyvinylacetates, ethylene-acrylic acid copolymers, ethylene-ethylacryl copolymers, ethylene-methylacryl copolymers, polyacrylic acids, polymethacrylic acids, polylactic acids, polyvinylbutyrals, polyvinylalcohols, polyvinylamines, amine-derived polymers, polyurethanes, polyureas and polyamides.

In accordance with one aspect of the present invention, there is provided a method for producing a thin green sheet comprising extruding a ceramic slurry composition to prepare an extruded sheet, and stretching the extruded sheet, wherein the ceramic slurry composition comprises 20~50 wt. % of a ceramic powder, 2~10 wt. % of a polymer having an average molecular weight of 400,000 or more, 0.1~2 wt. % of a polymer having hydrogen bond-forming functional groups, and 40~75 wt. % of a solvent.

In accordance with another aspect of the present invention, there is provided a method for producing a thin green sheet comprising extruding a ceramic slurry composition to prepare an extruded sheet, and stretching the extruded sheet, wherein the ceramic slurry composition comprises 20~50 wt. % of a ceramic powder, 2~10 wt. % of a polymer having an average molecular weight of 400,000 or more, 0.1~2 wt. % of a polymer having hydrogen bond-forming functional groups, 40~75 wt. % of a solvent, and 1~5 wt. % of a polymer having an average molecular weight of 400,000 or less.

In accordance with yet another aspect of the present invention, there is provided an electronic device comprising dielectric ceramic layers, internal electrodes interposed between the respective dielectric ceramic layers, and external electrodes electrically connected to the respective internal electrodes, wherein the dielectric ceramic layers are 40-layer or more stacks formed by laminating green sheets, each of which has a thickness of 10 μm or less, the green sheets are produced by extruding the ceramic slurry composition of the present invention to form a sheet and stretching the extruded sheet, and the internal electrodes contain conductive components.

One example of the conductive components is a nickel (Ni).

BRIEF DESCRIPTION OF THE DRAWINGS

The above and other objects, features and other advantages of the present invention will be more clearly understood from the following detailed description taken in conjunction with the accompanying drawings, in which:

FIG. 3a is a cross-sectional view schematically showing a conventional electronic device (pillowing phenomenon occurs); while FIG. 3b is a cross-sectional view schematically showing an electronic device fabricated in accordance with the present invention (no pillowing phenomenon occurs).

DESCRIPTION OF THE PREFERRED EMBODIMENTS

Hereinafter, the present invention will be explained in more detail.

Since high molecular weight polymers such as polyolefins have a high non-polarity, the adhesive strength between polyolefins and other materials such as metals or ceramics, and between polyolefins themselves is very low. When green sheets containing polyolefin are laminated and sintered, cracks and delamination are likely to happen between layers due to their low adhesive strength. The present inventors have intensively researched to increase the adhesive strength between layers. As a result, it has been found that when a polymer having hydrogen bond-forming functional groups is mixed, the adhesive strength between green sheets is increased, and the draw ratio of an extruded sheet during stretching the extruded sheet is maximized.

Figure 1:
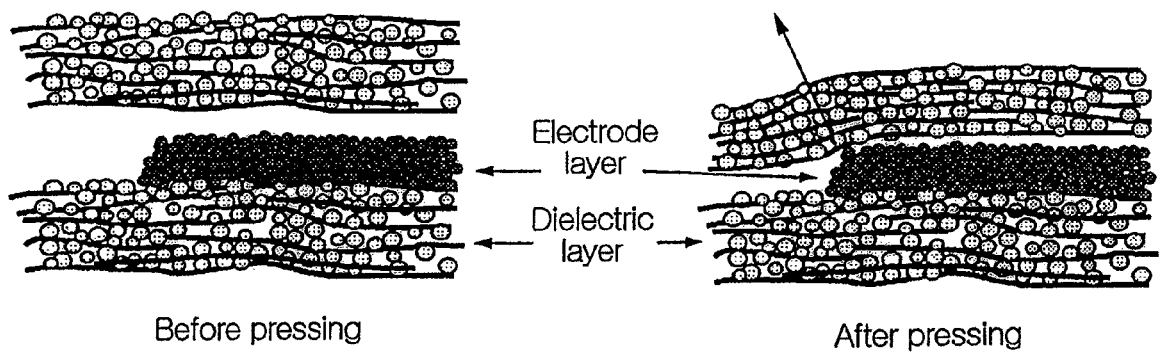
FIG. 1 is a cross-sectional view schematically showing the repulsive force occurring during pressing green sheets and internal electrodes.

A green sheet can be produced from a polymer having an average molecular weight of 400,000 or higher using an extrusion-stretching process. However, the green sheet thus produced has a high Young's module of several ten to hundred GPa. This high Young's module enables the formation of a support-free or self-supporting film and lamination of the film. However, when the green sheets and internal electrodes are laminated and pressed to each other, a repulsive force acts on the electrode layer and thus makes the depression of the electrode layer into the green sheets difficult. In addition, the repulsive force reduces the adhesive strength between the layers (see, FIG. 1). Furthermore, the repulsive force does not permit fabrication of a uniformly thick film. The present inventors have made efforts to solve the above-mentioned problems and, as a result, it has been found that the combination of an ultrahigh molecular weight polymer and a relatively low molecular weight polymer can reduce the repulsive force between an electrode layer and green sheets due to a high modulus of elasticity of the ultrahigh molecular weight polymer and facilitate the lamination of the layers, thereby easily fabricating an electronic device.

Hereinafter, the ceramic slurry composition of the present invention is explained.

[Ceramic Powder]

The ceramic powder used in the present invention includes dielectric ceramic powders, ferrite ceramic powders, magnetic ceramic powders, piezoelectric ceramic powders, insulating ceramic powders, etc. As dielectric ceramic powders, barium titanate, strontium titanate and lead titanate can be used. As insulating ceramic powders, silica can be used. The ceramic powder is used in the form of a fine powder to obtain its optimum smooth surface. Preferably, the ceramic powder has a particle size of 0.01~1 μm. The content of the ceramic powder is preferably in the range of 20~50 wt. %, based on the total weight of the ceramic slurry composition. When the content of the ceramic powder is less than 20 wt. %, the packing density of a final product becomes low and pores are likely to be formed, which causes defects of the final product. When the content of the ceramic powder exceeds 50 wt. %, relative content of the polymer is small. Accordingly, the strength of the green sheet is poor and thus the forming of the green sheet is difficult.

[Polymer]

A representative example of the polymer is polyolefins. Examples of the polyolefins include polyethylenes, polypropylenes, polystyrenes, polyisobutylenes, etc. As a polymer, a polymer having an average molecular weight of 400,000 or more (simply, referred to as a 'high molecular weight polymer') can be used alone, or in combination with a polymer having an average molecular weight of 400,000 or less (simply, referred to as a 'low molecular weight polymer'). The combination of the high molecular weight polymer and the low molecular weight polymer reduces the repulsive force between an electrode layer and green sheets caused by a high modulus of elasticity of the high molecular weight polymer and facilitate the lamination of the layers, thereby easily fabricating an electronic device.

The content of the high molecular weight polymer is preferably within the range of 2~10 wt. %, based on the total weight of the ceramic slurry composition. When the content is less than 2 wt. %, forming into a sheet is difficult. When the content exceeds 10 wt. %, the forming into a sheet is difficult and ceramic packing density is reduced when sintered.

When the low molecular weight polymer is combined with the high molecular weight polymer, it is preferable that the content of the low molecular weight polymer is within the range of 1-5 wt. %. When the content is less than 1 wt. %, there are risks that interlayer cracks and a pillowing phenomenon occur due to the repulsive force of the high molecular weight polymer when laminated into high layers. When the content of the low molecular weight polymer exceeds 5 wt. %, the strength of the green sheet is lowered.

[Polymer Having Hydrogen Bond-Forming Functional Group]

Figure 2:
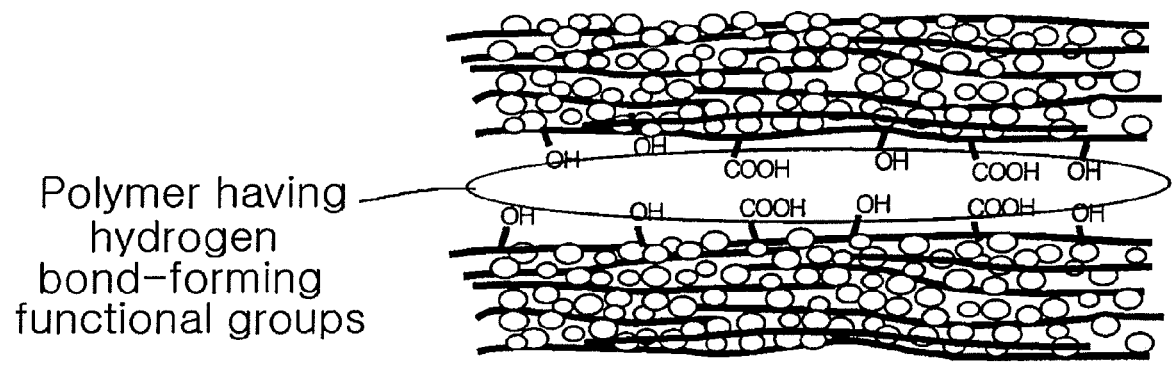
FIG. 2 is a cross-sectional view schematically showing the influence of a polymer having hydrogen bond-forming functional groups, on the adhesive strength between green sheets and internal electrodes.

Referring to FIG. 2, the polymer having hydrogen bond-forming functional groups improves the adhesive strength between green sheets. In addition, the polymer maximizes the draw ratio during stretching an extruded sheet.

The hydrogen bond-forming functional groups are selected from the group consisting of —OH, —COOH, —COOCH$_3$, —NH$_2$, —NHCO and the like. Examples of the polymer having the functional groups include polyvinylacetates, ethylene-acrylic acid copolymers, ethylene-ethylacryl copolymers, ethylene-methylacryl copolymers, polyacrylic acids, polymethacrylic acids, polyvinylbutyrals, polyvinylalcohols, polyvinylamines, amine-derived polymers, polyurethanes, polyureas, polyamides and the like.

The content of the polymer having hydrogen bond-forming functional groups is preferably in the range of 0.1~2 wt. %, based on the total weight of the ceramic slurry composition. When the content is less than 0.1 wt. %, cracks between the green sheet layers are likely to occur due to fewer hydrogen bonds. When the content exceeds 2 wt. %, the sheets are difficult to handle on account of their increased tackiness.

[Solvent for Gelling High Molecular Weight Polymer]

A high molecular weight polymer has little or no flowability in its molten state. Accordingly, the polymer is mixed with a solvent at high temperature to form a gel. This formation of gel increases the melt flowability of the polymer. Thereafter, the gel is subjected to an extrusion, and then evaporated and extracted to remove the solvent.

In the present invention, as the solvent for gelling the high molecular weight polymer, paraffins, decahydronaphthalene, tetrahydronaphthalene, naphtha, mineral spirit, toluene, xylene, hexane, chloroform or a mixture thereof, can be used.

The content of the solvent is preferably within the range of 40~75 wt. %, based on the total weight of the ceramic slurry composition. When the content of the solvent is less than 40 wt. %, there is a need to increase the extrusion temperature. When the extrusion temperature is too high, the polymer tends to be decomposed, making sheet forming difficult. When the content of the solvent exceeds 75 wt. %, uniform shape of an extruded sheet cannot be retained, also making the sheet forming difficult.

[Other Additives]

The ceramic slurry composition of the present invention may further comprise a dispersant, a wetting agent, etc., as an additive. The additive preferably has a content of 0.01~1 wt. %, based on the total weight of the ceramic slurry composition.

A method for producing the green sheet of the present invention and an electronic device fabricated using the green sheet will now be explained.

The green sheet is produced by extruding the ceramic slurry composition of the present invention, followed by stretching. The method will be explained in terms of the respective steps.

[Preparation of Slurry]

First, a ceramic dispersion is prepared.

A ceramic powder is dispersed in a mixture of a solvent and a suitable dispersant. Examples of the solvent include aromatic hydrocarbons such as decalin or paraffin oils or aliphatic hydrocarbons. To disperse the ceramic powder, a bead mill, a ball mill or an attritor, a paint shaker, a sand mill, etc., can be used. During dispersing the ceramic powder, too high grinding power leads to excessive damage to the ceramic powder. That is, too high grinding power results in deteriorated crystallinity of the ceramic powder and increased specific surface area, thereby failing to obtain intended electrical properties. To prevent such problems, a high-pressure dispersion process can be performed. The process is carried out by dispersing the ceramic powder using a collisional energy, and rapidly passing through a tapered channel under high pressure.

Next, ceramic slurry is prepared.

The ceramic slurry is prepared by mixing the ceramic dispersion, the high molecular weight polymer (if necessary low molecular weight polymer), the polymer having hydrogen bond-forming functional groups and the solvent. If necessary, an additive is further added to the mixture.

[Production of Green Sheet]

The ceramic slurry thus prepared is extruded to be shaped into a green sheet. First, the ceramic slurry composition of the present invention is fed into an extruder and gelled therein. The gelled mixture is extruded to be shaped into a sheet form, rapidly cooled to obtain a gel crystal, and dried.

The temperature of the extruder is preferably within the range of 150~200° C., and that of a die (T-die or coat hanger-die) in the extruder is preferably set to a temperature of 160~180° C.

The dried sheet is then stretched. The dried sheet may be stretched either biaxially or uniaxially. In the case of the biaxial stretching, the dried sheet is stretched in longitudinal and transverse direction at the same draw ratio, or at a draw ratio higher in longitudinal direction than in transverse direction, or vice versa. The longitudinal and transverse stretching may be alternatively carried out, but preferably carried out simultaneously. The biaxial stretching is preferably carried out at 70~200° C.

Extraction is carried out to remove remaining solvents, followed by drying to produce a green sheet. The green sheet thus produced has a thickness of a few μm and contains micropores therein.

[Fabrication of Electronic Device]

After an electrode layer is formed using the green sheets thus produced, the green sheets are laminated in a desired number of layers using a heat-pressing process. After lamination, a binder burn out and a sintering process are carried out to fabricate an electronic device.

Since the green sheet produced using an extrusion-stretching process contains a number of pores therein, it has a low density. The combination of the low-density green sheet and a low molecular weight polymer helps prevent a pillowing phenomenon.

Hereinafter, the present invention will be described in more detail with reference to the following Examples.

Example 1

Hypermer KD-3 (ICI) as a dispersant and OLOA1200 (Shevron ornite) as a wetting agent were dissolved in decahydronaphthalene as a solvent 1 (first use of solvent 1).

To the resulting solution, barium titanate having a diameter of 0.4 μm was added. After the mixture was dispersed using a basket mill for 3 hours, decahydronapnthalene (second use) or a paraffin oil as a solvent 2 were added to the dispersion, and then polymers were added thereto with slow stirring. The resulting mixture was stirred for 1 hour to obtain a slurry solution. The mixing ratio in the slurry solution is shown in Table 1 below.

TABLE 1

Slurry composition (parts by weight)

| Examples | Dispersant | Wetting agent | Ceramic powder | Solvent 1 First use | Solvent 1 Second use | Solvent 2 | Polymer[1] | Polymer[2] | Polymer[3] |
|---|---|---|---|---|---|---|---|---|---|
| Exa. 1 | 0.9 | 0.3 | 90 | 30 | 30 | 30 | 7.5 | 3.0 | 0.5 |
| Comp. Exa. 1 | 0.9 | 0.3 | 90 | 30 | 60 | | 10 | | |
| Exa. 2 | 0.9 | 0.3 | 90 | 30 | 60 | | 7.5 | 3.0 | 0.5 |
| Exa. 3 | 1.1 | 0.3 | 90 | 30 | 60 | | 10 | | 0.5 |

[1]High molecular weight polymer: average molecular weight: 3,500,000, Ticona GUR 4012 (Example 1, Comparative Example 1), average molecular weight: 5,000,0000, Ticona GUR 4186 (Examples 2 and 3)
[2]Low molecular weight polymer: average molecular weight: 300,000~400,000, TR570.
[3]polymer having hydrogen bond-forming functional groups: Polyvinylacetate (Examples 1 and 3), EVA (Example 2)

The slurry solution was fed into a twin-screw extruder equipped with a melt pump and a coat hanger die while gently stirring, and gelled to produce an extruded sheet. At this time, the temperature of the extruder and the die were set to 100~220° C. and 170° C., respectively. After the extruded sheet was passed through a cold water bath to obtain a gel crystal and partially dried, the dried sheet was biaxially stretched at a draw ratio of 10×10 at 110° C. The stretched sheet was passed through a hexane solution to remove solvents remaining therein, and finally produce a green sheet having a thickness of 10 μm.

The produced green sheet was cut to prepare single layer green sheets. The single layer green sheets were pressed to each other under 5 Mpa at 130° C. for 3 minutes and laminated in a 20-layer stack to prepare a cover sheet. After the cover sheet was fixed, one single layer green sheet was pressed under 8 MPa at 130° C. for 5 seconds. An electrode layer was formed using a screen printing process, and dried at 70° C. for 5 minutes. After the procedure was repeated 40 times to form a 40-layer active layer, the cover sheet was pressed thereto, and subjected to a dicing and trimming process. Finally, the binder was burned out in nitrogen atmosphere and sintering was carried out in a weak reducing atmosphere to fabricate an electronic device.

The adhesive strength between sheets of the electronic device thus fabricated was measured. The results are shown in Table 2 below. The pillowing phenomenon was visually observed.

TABLE 2

| Examples | Adhesive strength between sheets (kgf/cm) |
|---|---|
| Example 1 | 21 |
| Comparative Example 1 | 7 |
| Example 2 | 18 |
| Example 3 | 14 |

As shown in Table 2, the electronic device (Example 3) fabricated by mixing the ceramic slurry with the polymer having hydrogen bond-forming functional groups showed an adhesive strength 2 times higher than that of the electronic device (Comparative Example 1) containing no polymer having hydrogen bond-forming functional groups. In addition, the adhesive strength between sheets of the electronic devices (Examples 1 and 2) fabricated by mixing the low molecular weight polymer was greatly improved.

As shown in FIG. 3(a), a pillowing phenomenon wherein a margin zone is collapsed and an active zone is swelled was visually observed in the electronic device of Comparative Example 1. By contrast, no pillowing phenomenon was visually observed in the electronic devices of Examples 1~3.

As apparent from the above description, since the green sheet of the present invention is produced using an extrusion-stretching process, no substrate (support film) is required, unlike a tape casting process. In addition, since the ceramic slurry composition of the present invention is gelled prior to removal of solvents, forming into a low-density green sheet is possible. Accordingly, the green sheet can be depressed to prevent occurrence of a pillowing phenomenon. Furthermore, the combination of a polymer having hydrogen bond-forming functional groups increases the adhesive strength between layers, and the combination of a high molecular weight polymer and a low molecular weight polymer can reduce the repulsive force between electrode layers and improve formability of the green sheet. The low molecular weight polymer and the polymer having hydrogen bond-forming functional groups act as a binder to improve stretchability of the high molecular weight polymer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A ceramic green sheet configured for an electronic device, the green sheet formed by extruding a slurry composition comprising 20 wt %-50 wt % of a ceramic powder, 2 wt %-10 wt % of a first polymer having an average molecular weight of 400,000 or more, 0.1 wt %-2 wt % of a second polymer having hydrogen bond-forming functional groups, and 40 wt %-75 wt % of a solvent, and 1 wt %-5 wt % of a third polymer having an average molecular weight of 400,000 or less, wherein the ceramic green sheet has a thickness of about 10 μm or less and wherein at least one of the first polymer and the third polymer is a polyolefin.

2. A ceramic green sheet according to claim 1, wherein the hydrogen bond-forming functional groups are selected from the group consisting of —OH, —COOH, —COOCH3, —NH2 and —NHCO.

3. A ceramic green sheet according to claim 1, wherein the second polymer having the hydrogen bond-forming functional groups is at least one polymer selected from the group consisting of polyvinylacetates, ethylene-acrylic acid copolymers, ethylene-ethylacryl copolymers, ethylene methylacryl copolymers, polyacrylic acids, polymethacrylic acids, polylactic acids, polyvinylbutyrals, polyvinyl alcohols, polyvinylamines, amine-derived polymers, polyurethanes, polyureas and polyamides.

4. A ceramic green sheet according to claim 1, wherein the solvent comprises at least one of paraffins, decahydronaphthalene, tetrahydronaphthalene, naphtha, mineral spirit, toluene, xylene, hexane, and chloroform.

5. An electronic device comprising:
dielectric ceramic layers;
internal electrodes interposed between respective dielectric ceramic layers; and
external electrodes electrically connected to the respective internal electrodes,
wherein the dielectric ceramic layers include a stack of several tens of layer thick laminated green sheets according to claim 1, with a thickness of 10 μm or less, and the internal electrodes contain conductive components.

6. The electronic device according to claim 5, wherein the ceramic green sheet is laminated to form an at least 40 layer thick stack.

7. An electronic device comprising:
dielectric ceramic layers;
internal electrodes interposed between respective dielectric ceramic layers; and external electrodes electronically connected to the respective internal electrodes,
wherein the dielectric ceramic layers include at least 40 layers of stacked laminated green sheets according to claim 1, with a thickness of 10 μm or less, and the internal electrodes contain conductive components, wherein the green sheets are produced by:
extruding a ceramic slurry composition to prepare an extruded sheet; and
stretching the extruded sheet,
wherein the ceramic slurry composition comprises:
20 wt %-50 wt % of a ceramic powder selected in an amount to attenuate pore formation in the green sheet;
2 wt %-10 wt % of a first polymer having an average molecular weight of 400,000 or more;
0.1 wt %-2 wt % of a second polymer having hydrogen bond-forming functional groups;
1 wt %-5 wt % of a third polymer having an average molecular weight of 400,000 or less; and
40 wt %-75 wt % of a solvent; wherein at least one of the first polymer and the third polymer is a polyolefin.

* * * * *